Oct. 18, 1955    L. R. O'NEILL    2,721,317
APPARATUS FOR GAUGING AND MARKING LENGTHS OF GLASS TUBING
Filed Jan. 14, 1952    4 Sheets-Sheet 1
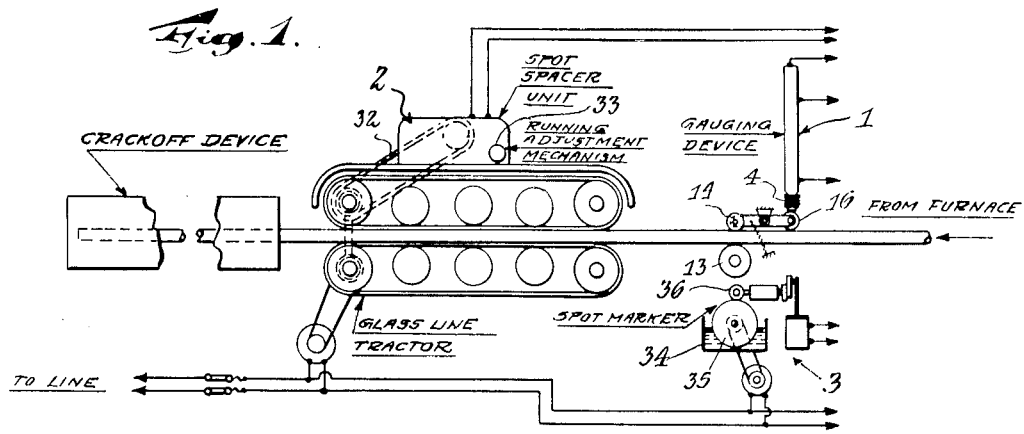
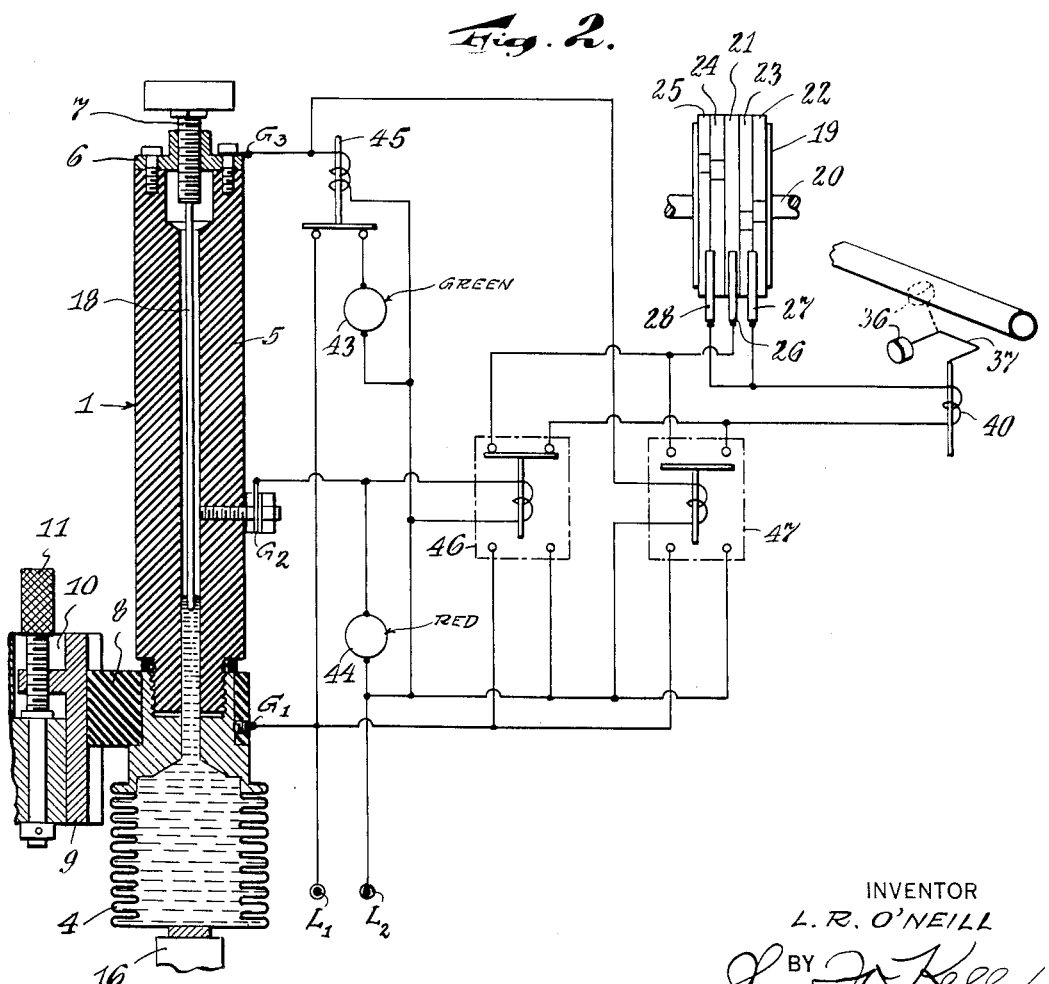
INVENTOR
L. R. O'NEILL
BY
ATTORNEY Oct. 18, 1955 L. R. O'NEILL 2,721,317
APPARATUS FOR GAUGING AND MARKING LENGTHS OF GLASS TUBING
Filed Jan. 14, 1952 4 Sheets-Sheet 2

INVENTOR
L. R. O'NEILL.
BY
ATTORNEY

Oct. 18, 1955      L. R. O'NEILL      2,721,317
APPARATUS FOR GAUGING AND MARKING LENGTHS OF GLASS TUBING
Filed Jan. 14, 1952      4 Sheets-Sheet 4

INVENTOR
L. R. O'NEILL

United States Patent Office 2,721,317
Patented Oct. 18, 1955

2,721,317

APPARATUS FOR GAUGING AND MARKING LENGTHS OF GLASS TUBING

Louis R. O'Neill, Shinnston, W. Va., assignor to Westinghouse Electric Corporation, East Pittsburgh, Pa., a corporation of Pennsylvania Application January 14, 1952, Serial No. 266,432

9 Claims. (Cl. 340—265)

This invention relates to gauges and, more particularly, to a glass line gauge for use in the manufacture of glass tubing.

In the manufacture of glass tubing, predetermined amounts (depending upon the type of glass being produced) of silica in the form of special sand, soda ash, feldspar, anhydrous borax, dolomite lime, small amounts of alkali metal carbonates and borates, cullet material left over from sealing operations and a decolorizing material, such as arsenic, all are fed into a glass furnace. After reaching the desired molten state, the glass flows onto a rotating mandrel and is blown with the proper air pressure into plastic tubing which drops by force of gravity onto a roller conveyor several hundred feet long. The tube is drawn along the conveyor at a speed of 100 to 1000 feet per minute by a tractor.

At the forward end of the tractor the tubing is cut to predetermined lengths and the outside diameter is manually inspected within specified limits which are critical in the sealing of electric discharge devices of the positive column type, such as fluorescent lamps.

Manual inspection is defined as calipering the outside diameter of the tube at two points, approximately four inches from each end of the cut length. Tubing within specified limits at such points is acceptable. If it be larger or smaller, such cut lengths are rejected and returned to the furnace for remelting.

To prevent excessive shrinkage in a high speed operation of this type, it is desirable to caliper the running tube continuously and to indicate visually variations in the outside diameter which are beyond the specified limits.

It is also desirable from a production standpoint that manual inspection be dispensed with and that the cut lengths of tubing having a diameter outside of limits at the four inch inspection points be identified and sorted automatically.

Hence it has been found advantageous to employ the gauge of my invention for a glass tubing line which will continuously indicate the size of the running tubing, and whether the tubing is within specified limits; identify or mark the out of limit tubing with reference to these limits or mechanically to separate off limit cut lengths of tubing from acceptable ones.

The gauge is a simple amplifying device comprising a column of mercury contained in a metal bellows affixed to the lower end of a column of Lucite or other insulating material, preferably transparent.

The gauge is mounted on a lever with a bottom or measuring roller on its opposite end. An upper measuring roller is mounted on another lever whose axis is common with the gauge lever. The opposite end of the upper measuring lever is fitted with a disc of insulating material.

The two measuring rollers are kept in close contact with the running tube; variations in tube diameter are transmitted to the bellows by the action of the levers. Variations in tube diameter vary the height of the mercury in the Lucite column.

The amplification rate is the ratio between the bellows area and the area of the bore in the column. With a rate of 24:1, variations in tube diameter can be clearly seen and photographed.

To obtain two electrical circuits, current is supplied to a contactor G1 connected to the bellows, hence to the mercury content thereof. A second contactor G2 is transversely mounted in the Lucite column near its lower end. A third contactor G3 is axially mounted in the bore and at the top of the Lucite column and is axially adjustable.

The bellows and column as a unit are adjustable with reference to the opening between the two measuring rolls.

With the arrangement described, it is clear that a tube large enough to meet specified limits will cause the mercury to rise in the column and close the circuit G1—G2. A larger tube will cause the mercury to fall and open the circuit.

As the tube runs smaller, the mercury rises still higher and closes the circuit G1—G3, G1 being common to both circuits.

By the means thus described, two circuits are available to indicate continuously that the running tube is within or beyond limits and in which sense. When it is within limits circuit G1—G2 is closed, G1—G3 is open. If the tube is too large, both circuits are open, if too small, both are closed.

Current supplied to the gauge column in the manner indicated is carried to two indicating lamps. G1—G2 is carried in parallel to a red lamp which is consequently lit as long as the tube is not too large.

G1—G3 is carried in parallel to the coil of a single pole, single throw, normally closed relay in series with a green lamp, energized from the power source. Hence the green lamp is lit as long as the tube is large enough and goes out when the circuit G1—G3 is closed and opens the relay.

Thus the first objective is attained. Two lamps red and green, are continuously lit as long as the running tube is within specified limits. The red lamp is extinguished whenever the tube is too large, the green one when it is too small.

To separate cut lengths of tube according to the gauge indications at points some four inches from each end requires that the two circuits G1—G2 and G1—G3 be operative on a marking, indicating or separating device at these two points only and be inoperative at all other points.

My invention employs the two circuits G1—G2 and G1—G3 to achieve this end. G1—G2 is carried in parallel with the red lamp to the coil of a double pole, single throw, normally closed relay, hence current flows from the power source through the relay only when circuit G1—G2 is open.

Similarly G1—G3 is carried in parallel with the coil on the green lamp relay to a double pole, single throw normally open relay, hence current flows from the power source through this second relay only when circuit G1—G3 is closed.

The two double pole relays are connected in parallel. Current flows through either only when the tube is over- or under-size. Thus a two wire circuit is available which indicates off-limit tubing continuously whenever it occurs.

My invention provides means for using this circuit to mark, indicate or separate cut lengths which deviate from acceptable limits at specified points by causing the relay circuit to flow through a spot spacing head.

The head consists of five rings on a common axis. One ring is a continuous conductor; it is mounted between two pairs of rings, each having a conducting circumferential area for a small arc, the remainder of the circumference being of insulating material. The five rings are angularly adjustable with relation to each other.

The head with its five rings is carried on a shaft fitted with a change gear engaging with a pinion on one end of a differential gear. The opposite end of the differential is chain driven from the tube tractor. The change gear is so arranged that its diameter is a factor of the length of tube being cut, hence the head rotates once for each cut length. Various lengths are accommodated by changing gears.

The interposition of a differential in the drive between the tractor and the head permits selection of the gauging points used for marking with relation to the cut ends of the tube.

The relay circuit in series is carried to the continuous ring on the head through a brush and through that ring to all four of the segmental rings, thence through two brushes to the marking, indicating or separating device.

By this means the relay circuit will be complete to the marking device only during the passage of one or the other of the segments under the brushes.

Inasmuch as the spot spacing head rotates once for each cut length, the angular separation of the segmental rings corresponds to the spacing of gauging points on the tube in terms of length.

Thus the second objective is attained. A simple circuit is energized only when the tube is over- or under-size at selected points in its length.

My invention uses the intermittently energized circuit to mark the tube with colored ink at specified points when the tube is beyond limits at those points. The circuit can be used for mechanical separation of rejected tubes.

The circuit from the spot spacing head is carried in series to a solenoid mechanically connected to a simple inking or printing device consisting of an ink fountain with a motor driven roll, a transfer roll engaging with the ink roll. The transfer roll moves through a 90° angle when actuated by the solenoid, carrying ink from the fountain roll to the running glass tube. In this fashion the tube is marked with a visible spot of color whenever it is beyond specified limits at selected points.

In its general aspect, the present invention has as its objective a gauge for a glass tubing line which eliminates excessive shrinkage and manual inspection of cut lengths.

Another object of the present invention is a glass tubing line gauge which continuously gives visual indication to a glass furnace operator of tubing size with reference to specified limits.

A further object is a glass line tubing gauge which will mark, identify or mechanically separate the "off-gauge" tubing at desired points on cut lengths.

Another object is a glass line gauge employing variations in the tubing diameter above and below the specified limits to control two electrical circuits in the giving of specified indications.

An additional object is an amplifying gauge having roller operated bellows affixed to a glass or Lucite tube containing mercury and having three contactors, thus providing two monitor lamp circuits, capable of giving a continuous visual indication of tubing size.

A still further object is an amplifying gauge having roller operated bellows affixed to a glass or Lucite tube containing mercury and three contactors, providing two circuits capable of energizing a spot printer solenoid to color spot mark "out of limit" tubing at spaced intervals, the spacing being controlled by a spot spacer unit.

A still further object is the employment of the two circuits to otherwise identify "out of limit" tubing at spaced intervals or mechanically to separate cut lengths of off-size tubing from acceptable cut lengths.

Other objects of the invention will appear to those skilled in the art to which it appertains as the description thereof proceeds, both by direct recitation thereof and by implication from the context.

Referring to the accompanying drawings, in which like numerals of reference indicate identical parts throughout the several views:

Fig. 1 is a diagrammatic view of the glass tubing line gauge, spot spacer unit and spot marking device of my invention, in combination with a tractor and crack-off device of a glass tubing line.

Fig. 2 is a schematic view of the apparatus of Fig. 1.

GENERAL DESCRIPTION

Line gauge

Figure 3:
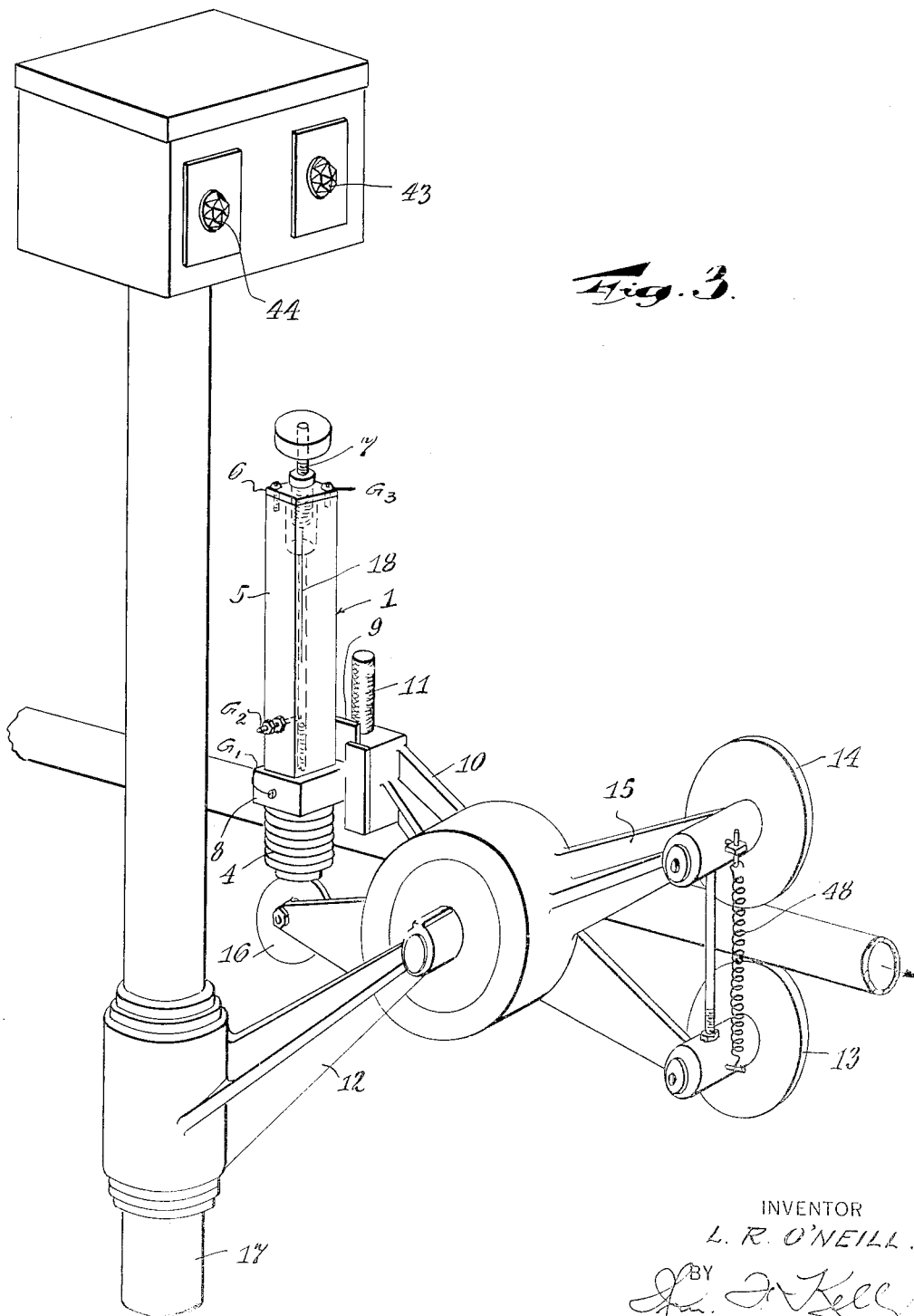
Fig. 3 is a perspective view of the line gauge, showing contacts and adjustments.

The line gauge, Fig. 3, is an amplifying device which includes a flexible metal bellows 4 to which is attached a column 5 of insulating material, preferably transparent, such as Lucite. The column has a vertical bore of uniform diameter connected with the bellows.

The upper end of the column 5 is covered with a tapped metal cap 6 through which passes a metal screw 7 carrying a contact wire 18 downward into the bore of the column.

Bellows 4 and column 5 are mounted in a block 8 of insulating material, carried on a slide 9 adjustable in its slideway on the gauge lever 10 by means of screw 11. The gauge lever 10 is pivoted on gauge support 12 and carries on its opposite end the lower measuring roll 13.

The upper measuring roll 14 is carried on its lever 15 coaxially with the gauge lever 10. Its opposite end carries a disc of insulating material 16 which bears against the bellows 4.

The glass tube being gauged runs between rolls 13 and 14; contact with the tube is effected by spring 48.

The four lever arms are equal in length, hence variations in tube diameter are transmitted to the lower end of bellows 4, which is filled with mercury. Compression and extension of the bellows causes the mercury to rise and fall in the column 5.

The effective area of the bellows is greater than the bore of the tube, amplifying the variation at a corresponding rate.

A terminal G1 is threaded into block 8 and makes contact with bellows 4 and its mercury content.

A terminal G2 is threaded transversely into column 5 so that its inner end is exposed to the mercury in the column bore.

A terminal G3 is attached to metal cap 6 and provides a current path to the mercury through screw 7 and contact wire 18.

Gauge support 12 is carried on a post 17 and can be adjusted vertically to suit the height of the glass tube line. It can also be rotated on the post so that the rolls engage or disengage the glass tube line.

A monitor box on top of post 17 carries green and red signal lamps 43 and 44, as well as three relays namely a single pole single throw normally closed relay 45 in series with the green lamp, a double pole single throw normally closed relay 46 and a double pole single throw normally open relay 47, schematically shown in Fig. 2.

Spot spacing head

Figure 4:
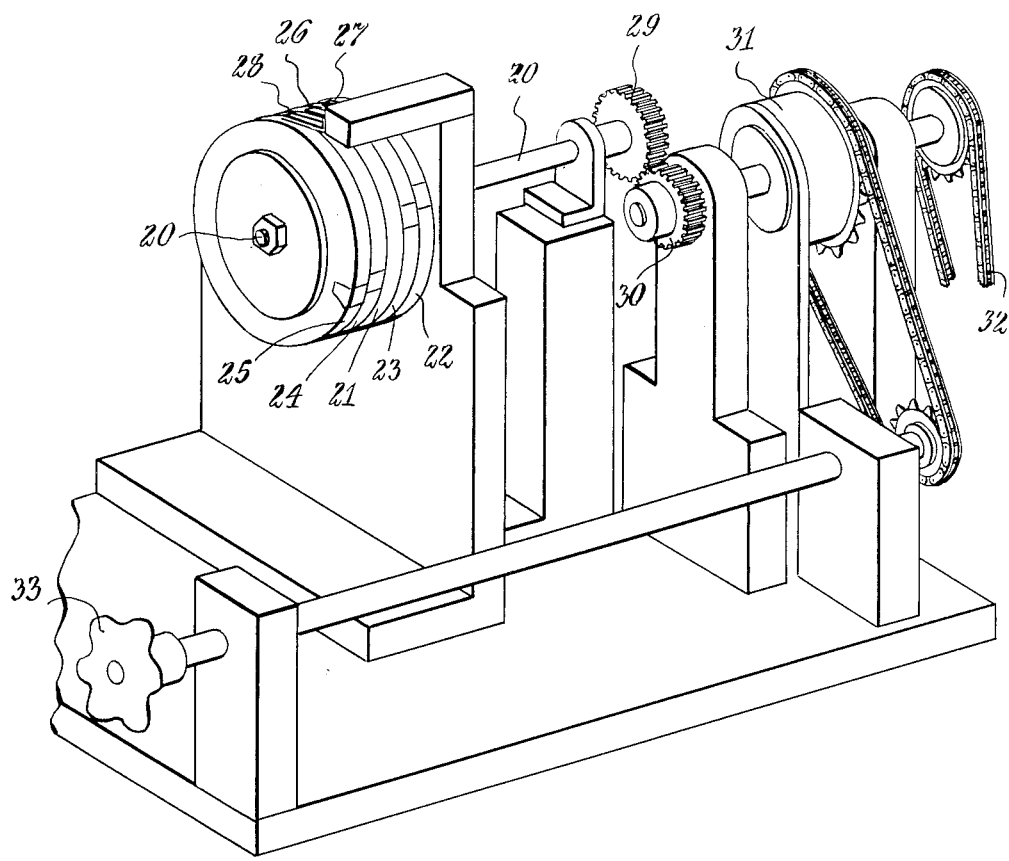
Fig. 4 is a perspective view of the spot spacer head and driving mechanism.

The head, Figure 4, consists of five rings carried on a shaft 20. Ring 21 is all metal; rings 22, 23, 24, and 25 are of insulating material except for a short arc of metal insert. The several rings are angularly adjustable on the shaft.

A brush contact 26 rides on ring 21, another brush contact 27 rides equally on rings 22 and 23, while a third brush contact 28 rides equally on rings 24 and 25.

Shaft 20 is driven by a change gear 29 meshing with pinion 30. Change gears of various diameters are used, the diameter being determined by the length of the tube to be cut.

Pinion 30 is attached to one stem of a bevel differential 31; the opposite stem is driven by chain 32 from the crack-off device on the tractor.

Adjusting knob 33 is geared to the shell of the differential. Rotation of the shell changes the angular relation of shaft 20 to the crack-off device.

*Spot marking device*

Figure 5:
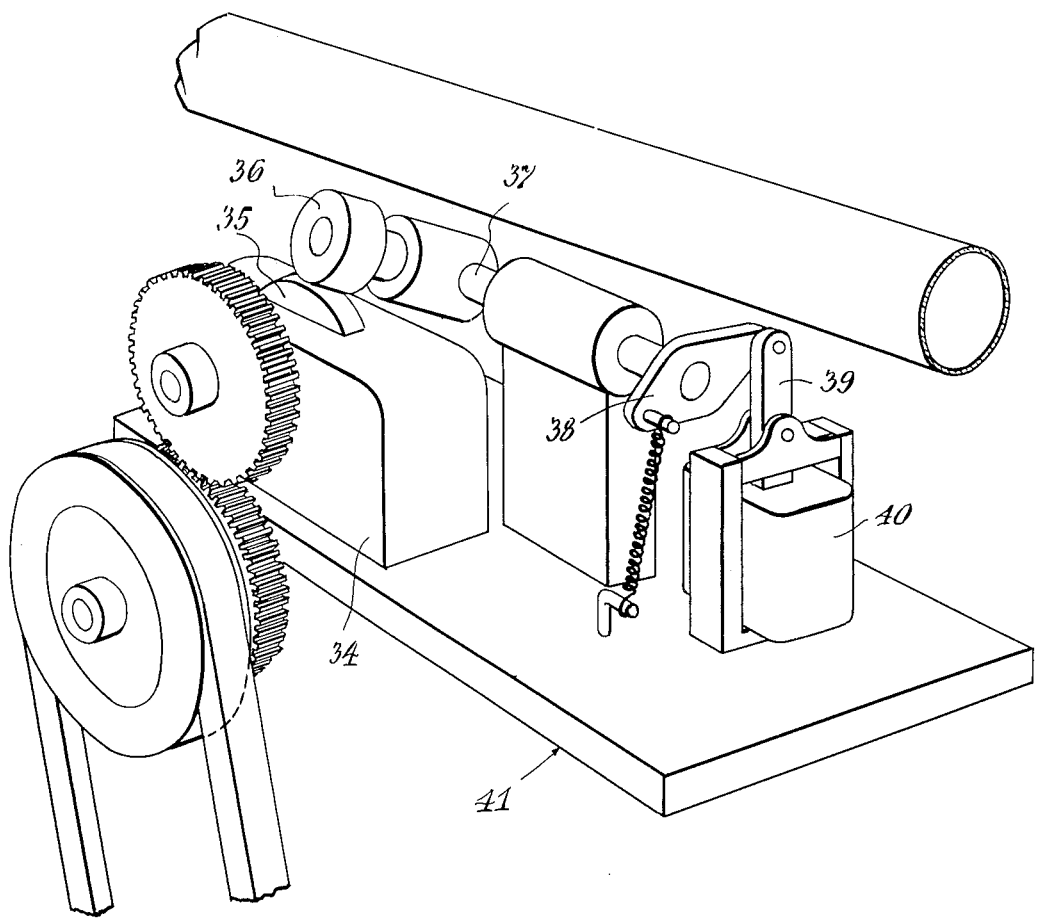
Fig. 5 is a perspective view of the spot marking device.

The device, Figure 5, includes a motor driven ink fountain 34 wherein revolves an ink roll 35, providing a constant supply of colored ink. A transfer roll 36 rides the ink roll and rotates on its pivot shaft 37 when solenoid 40 is energized. Movement of the solenoid armature is transmitted through link 39 and lever 38.

GENERAL OPERATION

Referring to the drawings and particularly to Fig. 2, the operation of the apparatus is clearly shown.

The line gauge is adjusted to the desired diameter limits. This is done by means of a gauge block having the limiting diameters ground on two steps. With the larger diameter between the measuring rolls 13 and 14, the gauge is adjusted with screw 11 until the mercury rises in column 18 to make contact at G2. With the lesser diameter between the measuring rolls, screw 6 is adjusted until the mercury which will have risen still higher in the column makes contact with wire 18.

So adjusted, the distance between contact G2 and the end of contact wire 18 is the amplified value of the diameter tolerance.

The gauge is then swung onto the glass tube line. As the tube runs between the measuring rolls, variations in diameter are constantly transmitted to the bellows and column. Current is supplied to the gauge as shown in Figure 2 from L1 and L2. As the mercury rises in the column and makes contact with G2, the circuit G1—G2 is closed and the red lamp 44 is lit. Normally closed relay 46 is open, its coil being in parallel with lamp 44, and no current will flow to the spot spacing head.

If the tube passing through the measuring rolls is oversize, the mercury will drop below contact G2, opening the circuit G1—G2, red lamp 44 will be out and current will flow through relay 46 to the spot spacing head.

As the tube diameter running through the measuring rolls becomes less, the mercury rises higher in the column and, when it has reached the minimum limit, it makes contact with wire 18, closing circuit G1—G3.

The green lamp 43 is lit from L1—L2 in series with normally closed relay 45. Its coil is energized by circuit G1—G3, hence the green lamp 43 will be lit until circuit G1—G3 is closed—when the green lamp will be out.

Current is supplied to normally open relay 47 from L1—L2 and its coil is in parallel with the coil on relay 45. Current will flow to the spot spacer head from relay 47 only when circuit G1—G3 is closed, i. e., when the tube is too small.

Current flows to the spot spacer head from either relay 46 or 47 only when the tube is beyond limits, hence the spot marking device is inoperative so long as the tube is acceptable.

When current flows from either relay, 46 or 47, it passes through the spot spacing head which is in series with the spot marking solenoid, but only during the time when a contact is made through the segmental rings 22, 23, 24 and 25 through their brushes 27 and 28. The effect of the spot spacing head is to mask—electrically—all but the desired inspection points.

When the spot marking solenoid 40 is energized, the transfer roll 36 moves through 90° and imprints a spot of colored ink on the tube.

The relation of inked spots to the cut ends of the tube is determined by means of the adjusting knob 33, Fig. 4.

It will be seen from the foregoing description that the apparatus of my invention eliminates excessive shrinkage and the manual inspection of cut lengths of tubing. It gives continual visual indication to the glass furnace operator of the size of the running tubing with reference to the specified outside diameter limits. The apparatus marks tubing with a visible colored spot at selected points in each of the cut lengths whenever the tube is beyond limits at such points. Circuits are so arranged as to make possible the mechanical separation of rejected lengths instead of marking or otherwise identifying them.

Although a preferred embodiment of my invention has been disclosed, it is to be understood that modifications may be made within the spirit and scope of the appended claims.

I claim:

1. Apparatus for continuously gauging glass tubing as it is being drawn, comprising a roller-actuated column of mercury contained in a flexible metal bellows affixed to a column of transparent insulating material, said column having a cylindrical bore whose area is substantially less than the effective area of the metal bellows, measuring rolls in continuous contact with the running tube, the movement of such rolls as the diameter of the tube varies being transmitted to the bellows, causing the mercury to rise and fall in the transparent column at an amplified rate, thereby making diameter variations easily visible and capable of being photographed to record and determine the magnitude and frequency of diameter variations.

2. Apparatus for continuously gauging glass tubing as it is being drawn, comprising a roller-actuated column of mercury contained in a flexible metal bellows affixed to a column of insulating material, said column having a cylindrical bore whose area is substantially less than the effective area of the metal bellows, measuring rolls in continuous contact with the running tube, the movement of such rolls as the diameter of the tube varies being transmitted to the bellows, causing the mercury to rise and fall in the column at an amplified rate, two electrical contacts in said column of insulating material and reaching the bore thereof, said contacts being arranged one above the other, an electrical contact affixed to the metal bellows, a closed circuit between the bellows and the lower of the two column contacts when mercury rises to the level of the lower contact, a second closed circuit between the bellows and the upper of the two column contacts when mercury rises to the level of the upper contact, each of said closed circuits including a signal device, said two signal devices being operated as the mercury rises and falls in the column indicating selected maximum and minimum diameters of the running tube.

3. Apparatus for continuously gauging glass tubing as it is being drawn, comprising a roller-actuated column of mercury contained in a flexible metal bellows affixed to a column of insulating material, said column having a cylindrical bore whose area is substantially less than the effective area of the metal bellows, measuring rolls in continuous contact with the running tube and transmitting diameter variations to the bellows, causing vertical movement of the mercury in the column, means for varying the position of the bellows with relation to the space between the measuring rolls in order to raise the mercury in the column to any desired height for a selected space between the measuring rolls, an electrical contact transversely disposed through the wall of the insulating column and reaching the bore thereof, a second electrical contact inserted in the bore of the insulating column from its upper end and vertically adjustable, thereby making the space between contacts readily variable, an electrical contact affixed to the metal bellows, a closed circuit between the bellows and the lower transverse contact when the mercury rises to the level of that contact, a second closed circuit between the bellows and the adjustable upper contact in the bore of the column when the mercury rises to the level of said upper contact, said two circuits indicating selected maximum and minimum diameters, each capable of variation at will.

4. Apparatus for continuously gauging glass tubing as it is being drawn, comprising a roller-actuated mercury column gauge including a metal bellows, means for varying the position of the gauge bellows with relation to the space between the gauge measuring rolls, electrical contacts in the bore of the gauge column adjustable in relation to each other, an electrical contact with the metal bellows of the gauge, a closed circuit between the bellows and the lower of the column contacts which occurs when the mercury rises to the level of the lower contact, a second closed circuit between the bellows and the upper column contact when the mercury rises to its level, each circuit operating a signal lamp which is lit and extinguished as the running tube diameter respectively equals and exceeds selected maximum and minimum values.

5. Apparatus for continuously gauging glass tubing as it is being drawn, comprising a roller-actuated mercury column gauge, an electrical circuit closed by the movement of the mercury when the tube is of less diameter than a selected maximum, said circuit being open when the maximum diameter is exceeded, a second circuit which is open when the tube diameter is greater than a selected minimum, said circuit being closed by the movement of the mercury when the tube diameter is less than the selected minimum, a normally-open relay and a normally-closed relay connected in parallel, said relays being operated by the maximum and minimum gauge circuits, thus closing a single circuit when the tube diameter is greater than a selected maximum or less than a selected minimum.

6. Apparatus for gauging running glass tubing, comprising a roller-actuated mercury column gauge, an electrical circuit which is closed when the tube diameter is greater than a selected maximum or less than a selected minimum, said circuit being open whenever the diameter of the running tube is within selected maximum and minimum values, means for opening said circuit at selected intervals corresponding to selected points in the total length of the tube as it is cut, comprising one metal ring whose entire circumference is an electrical conductor and at least two rings whose circumference is of insulating material except for segmental insets of conducting material, brushes in contact with each of the several rings, said rings being mounted on a common shaft driven by a crack-off device on the tube tractor, so that the rings rotate once for each length of tube cut, a circuit closed whenever the running tube exceeds selected limits in series with said rings and their brushes, the whole providing a closed electrical circuit when the running tube exceeds selected limits at selected points in the cut length, said circuit being open at all other points in the length, regardless of the tube diameter.

7. A spot spacing head in series with a running line gauge circuit, said circuit being closed whenever the running tube exceeds selected maximum and minimum limits and open whenever the tube is within those limits, said head comprising one metal ring whose entire circumference is an electrical conductor and at least two rings whose circumference is of insulating material except for segmental insets of conducting material, said rings being mounted on a common shaft, said segmental rings being angularly adjustable, contact brushes for each of the several rings, said head being driven by a crack-off mechanism of the tube tractor and rotating once for each length of tube cut, with the result that the line gauge circuit is closed only when selected points in the cut length of the tube are passing through the gauge, the gauge circuit being open at all other points.

8. An electrical limit gauge comprising a roller actuated column of mercury contained in a flexible metal bellows affixed to a column of insulating material, said column having a cylindrical bore whose area is substantially less than the effective area of the bellows, measuring rolls in contact with the material being gauged and transmitting size variations to the bellows, causing vertical movement of the mercury in the column, means for varying the position of the bellows with relation to the measuring space in order to raise the mercury in the column to any desired point, an electrical contact on the bellows, a second electrical contact transversely disposed through the wall of the insulating column and reaching the bore thereof, a third electrical conductor inserted in the bore of the insulating column from its upper end and vertically adjustable, thereby making the space between the second and third contacts variable, the whole providing one circuit through the bellows and the second contact when the gauge is set to a selected value, and a second circuit through the bellows and the third contact when the gauge is set to a selected minimum value.

9. A spot spacing head for apparatus for gauging running glass tubing in series with a solenoid mechanically connected to a spot marking mechanism and comprising a shaft, a metallic ring and a plurality of angularly adjustable insulating rings having metallic segments on said shaft, a plurality of brush contacts in engagement with said metallic ring and said insulating rings, an adjustable bevel differential for permitting a variable angular relation of said head to a crackoff device associated with said apparatus, means for connecting said shaft to said bevel differential and means for driving said bevel differential.

References Cited in the file of this patent

UNITED STATES PATENTS

| | | |
|---|---|---|
| 2,433,028 | Clapper | Dec. 23, 1947 |
| 2,519,221 | Bogen et al. | Aug. 15, 1950 |